(12) United States Patent
Wang et al.

(10) Patent No.: US 10,334,238 B2
(45) Date of Patent: Jun. 25, 2019

(54) METHOD AND SYSTEM FOR REAL-TIME RENDERING DISPLAYING HIGH RESOLUTION VIRTUAL REALITY (VR) VIDEO

(71) Applicant: Black Sails Technology Inc., Sunnyvale, CA (US)

(72) Inventors: Zhuo Wang, Sunnyvale, CA (US); Yongtao Tang, San Leandro, CA (US); Ruoxi Zhao, San Jose, CA (US); Haoyan Zu, Newark, CA (US); Chia-Chi Chang, San Jose, CA (US)

(73) Assignee: Black Sails Technology Inc., Sunnyvale, CA (US)

( * ) Notice: Subject to any disclaimer, the term of this patent is extended or adjusted under 35 U.S.C. 154(b) by 0 days.

(21) Appl. No.: 15/860,449

(22) Filed: Jan. 2, 2018

(65) Prior Publication Data
US 2018/0192026 A1 Jul. 5, 2018

Related U.S. Application Data

(60) Provisional application No. 62/441,936, filed on Jan. 3, 2017.

(51) Int. Cl.
*H04N 7/12* (2006.01)
*H04N 11/02* (2006.01)
(Continued)

(52) U.S. Cl.
CPC .......... *H04N 13/398* (2018.05); *G06F 3/011* (2013.01); *G06F 3/012* (2013.01); *G06T 9/001* (2013.01); *G06T 15/04* (2013.01); *G06T 15/205* (2013.01); *H04L 43/0888* (2013.01); *H04L 65/601* (2013.01); *H04L 67/38* (2013.01); *H04N 5/76* (2013.01); *H04N 9/8715* (2013.01); *H04N 13/117* (2018.05); *H04N 13/122* (2018.05); *H04N 13/139* (2018.05); *H04N 13/161* (2018.05); *H04N 13/189* (2018.05);
(Continued)

(58) Field of Classification Search
None
See application file for complete search history.

(56) References Cited

U.S. PATENT DOCUMENTS

| 2015/0195489 A1* | 7/2015 | Sobti | H04N 7/142 348/14.08 |
| 2017/0004658 A1* | 1/2017 | Hammond | G06T 19/006 |
| 2018/0295400 A1* | 10/2018 | Thomas | H04N 21/85406 |

* cited by examiner

*Primary Examiner* — Talha M Nawaz
(74) *Attorney, Agent, or Firm* — JW Law Group (57) ABSTRACT

A method and a system for rendering VR video are disclosed. In the method, a base video model and an enhancement video model are built respectively, with UV coordinates being initialized. base video segments and enhancement video segments are obtained according to a user's viewport. A base video texture is generated according to pixel information of the base video segments and the UV coordinates of the base video model. An enhancement video texture is generated according to pixel information of the enhancement video segments and the UV coordinates of the enhancement video model. Pixel information is reconstructed by adding the base video texture and the enhancement video texture with each other according to alignment coordinates. An image is drawn according to the reconstructed pixel information. The method reduces data transmission and improves rendering efficiency without affecting the user's viewing experience.

10 Claims, 4 Drawing Sheets

(51) Int. Cl.

| | |
|---|---|
| *H04N 11/04* | (2006.01) |
| *H04N 13/398* | (2018.01) |
| *H04L 29/06* | (2006.01) |
| *H04N 13/332* | (2018.01) |
| *H04N 13/378* | (2018.01) |
| *H04N 13/383* | (2018.01) |
| *H04N 19/40* | (2014.01) |
| *H04L 12/26* | (2006.01) |
| *H04N 19/44* | (2014.01) |
| *H04N 19/70* | (2014.01) |
| *H04N 21/231* | (2011.01) |
| *H04N 21/233* | (2011.01) |
| *H04N 21/2343* | (2011.01) |
| *H04N 21/81* | (2011.01) |
| *H04N 13/189* | (2018.01) |
| *H04N 13/117* | (2018.01) |
| *H04N 13/161* | (2018.01) |
| *H04N 9/87* | (2006.01) |
| *H04N 13/344* | (2018.01) |
| *H04N 13/139* | (2018.01) |
| *H04N 13/122* | (2018.01) |
| *H04N 13/275* | (2018.01) |
| *G06F 3/01* | (2006.01) |
| *G06T 9/00* | (2006.01) |
| *G06T 15/04* | (2011.01) |
| *G06T 15/20* | (2011.01) |
| *H04N 5/76* | (2006.01) |
| *G06T 3/40* | (2006.01) |

(52) U.S. Cl.
CPC ......... *H04N 13/275* (2018.05); *H04N 13/332* (2018.05); *H04N 13/344* (2018.05); *H04N 13/378* (2018.05); *H04N 13/383* (2018.05); *H04N 19/40* (2014.11); *H04N 19/44* (2014.11); *H04N 19/70* (2014.11); *H04N 21/231* (2013.01); *H04N 21/2335* (2013.01); *H04N 21/234345* (2013.01); *H04N 21/234363* (2013.01); *H04N 21/234381* (2013.01); *H04N 21/816* (2013.01); *G06T 3/40* (2013.01); *G06T 2215/16* (2013.01)

METHOD AND SYSTEM FOR REAL-TIME RENDERING DISPLAYING HIGH RESOLUTION VIRTUAL REALITY (VR) VIDEO

CROSS-REFERENCE TO RELATED APPLICATION

This application claims the priority and benefit of U.S. provisional application 62/441,936, filed on Jan. 3, 2017, which is incorporated herein by reference in its entirety.

BACKGROUND OF THE DISCLOSURE

Field of the Disclosure

The present disclosure relates to a video processing technology, and more particularly, to a method and a system for real-time rendering.

Background of the Disclosure

Virtual Reality (VR) is a computer simulation technology for creating and experiencing a virtual world. For example, a three-dimensional real-time image can be presented based on a technology which tracks a user's head, eyes or hands. In the network-based virtual reality technology, full-view video data can be pre-stored on a server, and then transmitted to a display device. A display device can be glasses, a head-mounted display, etc. A video is displayed on the display device in accordance with a viewport of the user.

However, a high-resolution video data occupies large transmission of bandwidth and requires high computing power from the display devices. Presenting high-resolution VR video on internet is difficult. Precisely, the existing video streaming technology can not fulfill the virtual reality. Therefore, in order to VR video smoothly in real-, it is desirable to further improve the existing video streaming technology to save bandwidth and reduce performance requirements for display devices by a new way to encode store the VR video data on the server.

Therefore, it is desirable to further improve VR video processing on network and at device terminals to enhance the VR video viewing experience.

SUMMARY OF THE DISCLOSURE

In view of this, the present disclosure relates to a method and a system for real-time rendering to solve the above problems.

According to a first aspect of the present disclosure, there is provided a method for real-time rendering VR video, comprising:

building a base video model and an enhancement video model respectively;

initializing UV coordinates of the base video model and the enhancement video model;

obtaining base video segments and enhancement video segments according to a user's viewport;

obtaining pixel information of the base video segments and the enhancement video segments by decoding;

generating a base video texture according to the pixel information of the base video segments and the UV coordinates of the base video model, and an enhancement video texture according to the pixel information of the enhancement video segments and the UV coordinates of the enhancement video model;

determining alignment coordinates of the enhancement video texture;

generating reconstructed pixel information by adding the base video texture and the enhancement video texture with each other according to the alignment coordinates; and drawing an image according to the reconstructed pixel information.

Preferably, the base video model and the enhancement video model are the same polygonal sphere.

Preferably, the user's viewport is obtained from roll parameters a gyroscope device.

Preferably, the alignment coordinates the enhancement video texture after being aligned are calculated from the alignment coordinates of the enhancement video texture before being aligned.

Preferably, the step of calculation comprises:
setting a field of view fov to be $$fov \in \left\{\frac{\pi}{4}, \frac{\pi}{2}, \frac{3\pi}{4}, \pi, \frac{5\pi}{4}, \frac{3\pi}{2}, \frac{7\pi}{4}, 2\pi\right\},$$

and a zoom factor i to be calculated from fov according to Equation:

$$i = \frac{fov}{\frac{\pi}{4}},$$

wherein the U value $P_u^{Before}$ the enhancement video texture before being aligned is converted to the U value $P_u^{After}$ of the enhancement video texture after being aligned by Equation:

$$P_u^{After} = \left[\left(\frac{i}{8} + id * \Delta\right) * P_u^{Before}\right] \% 1,$$

where id is an identification of respective one of the enhancement video segments, $id*\Delta \in [0,1]$, and the V value $P_v^{Before}$ the enhancement video texture before being aligned is converted to the V value $P_v^{After}$ of the enhancement video texture after being aligned by Equation:

$$P_v^{After} = \frac{1}{4} + \frac{1}{2} * P_v^{Before}.$$

Preferably, the step of generating reconstructed pixel information by adding the base video texture and the enhancement video texture with each other according to the alignment coordinates comprises:

generating the reconstructed pixel information by Equation, $$Px, y^{Reconstructed} = Px, y^{ScaleBase} + Px, y^{NormalizedResidual} - \frac{H-L}{2},$$

wherein $Px,y^{Reconstructed}$ represents the reconstructed pixel information at the coordinate (x, y), $Px,y^{ScaleBase}$ represents the pixel information of the base video texture at the coordinate (x, y), $Px,y^{NormalizedResidual}$ represents the pixel information of the enhancement video texture at the coordinate (x, y), H and L represent a maximum value and a minimum value of the pixel information respectively.

Preferably, the API of OpenGL and/or WebGL is called to achieve related functions.

According to a second aspect of the present disclosure, there is provided a system for real-time rendering VR video, comprising:

an initialization module, configured to build a base video model and an enhancement video model respectively, and initialize UV coordinates of the base video model and the enhancement video model;

a download and decode module, configured to obtain base video segments and enhancement video segments according to a user's viewport, and obtain pixel information of the base video segments and the enhancement video segments by decoding;

a texture generation module, configured to generate a base video texture according to the pixel information of the base video segments and the UV coordinates of the base video model, and an enhancement video texture according to the pixel information of the enhancement video segments and the UV coordinates of the enhancement video model;

an alignment coordinate determination module, configured to determine alignment coordinates of the enhancement video texture;

a pixel calculation module, configured to generate reconstructed pixel information by adding the base video texture and the enhancement video texture with each other according to the alignment coordinates; and a drawing module, configured to draw an image according to the reconstructed pixel information.

Preferably, the base video model and the enhancement video model are the same polygonal sphere.

Preferably, the user's viewport is obtained from roll parameters of a gyroscope device.

In the method for real-time rendering VR video according to the present disclosure, the high-resolution video data is processed on the server into the enhancement video set and the base video set, the VR video data can be played on the terminal by adding the basic video and the enhancement video. Alignment coordinates of the basic video and the enhancement video are determined according to a user's viewport, thus reducing data transmission and improving rendering efficiency without affecting the user's viewing experience.

BRIEF DESCRIPTION OF THE DRAWINGS

The above and other objects, advantages and features of the present disclosure will become more fully understood from the detailed description given hereinbelow in connection with the appended drawings, and wherein.

DETAILED DESCRIPTION OF THE DISCLOSURE

Exemplary embodiments of the present disclosure will be described in more details below with reference to the accompanying drawings. In the drawings, like reference numerals denote like members. The figures are not drawn to scale, for the sake of clarity. Moreover, some well known parts may not be shown.

Figure 1:
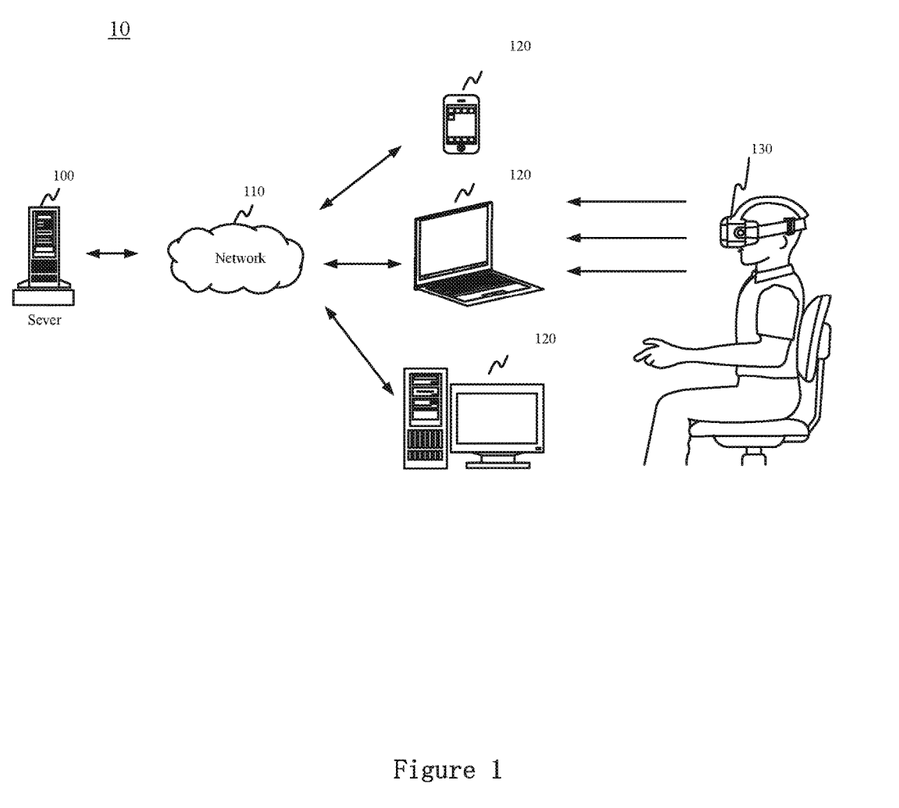
FIG. 1 is a diagram illustrating an example the network-based virtual reality playback system.

FIG. 1 is a diagram illustrating an example network of a VR playback system. The VR playback system 10 includes a server 100 and a display device 120 which are coupled with each other through a network 110, and a VR device. For example, the server 100 may be a stand-alone computer server or a server cluster. The server 100 is used to store various video data and to store various applications that process these video data. For example, various daemons run on the server 100 in real time, so as to process various video data in the server 100 and to respond various requests from VR devices and the display device 120. The network 110 may be a selected one or selected ones from the group consisting of an internet, a local area network, an internet of things, and the like. For example, the display device 120 may be any of the computing devices, including a computer device having an independent display screen and a processing capability. The display device 120 may be a personal computer, a laptop computer, a computer workstation, a server, a mainframe computer, a palmtop computer, a personal digital assistant, a smart phone, an intelligent electrical apparatus, a game console, an iPAD/iPhone, a video player, a DVD recorder/player, a television, or a home entertainment system. The display device 120 may store VR player software as a VR player. When the VR player is started, it requests and downloads various video data from the server 100, and renders and plays the video data in the display device. In this example, the VR device 130 is a stand-alone head-mounted device that can interact with the display device 120 and the server 100, and transmit information of a user's viewport to the display device 120 and/or the server 100 by signal, including change of the position of a user's helmet, change of the eye sight, and the like. The display device 120 can process flexibly the video data which is played according to the information. In some embodiments, when a user helmet's position is changed, the display device 120 determines that a central viewport of the user has been changed, and starts to play video data with a high resolution in the central viewport.

In the above embodiment, the VR device 130 is a stand-alone head-mounted device. However, those skilled in the art should understand that the VR device 130 is not limited thereto, and the VR device 130 may also be an all-in-one head-mounted device. The all-in-one head-mounted device itself has a display screen, so that it is not necessary to connect the all-in-one head-mounted device with the external display device. For example, in this example, if the all-in-one head-mounted device is used as the VR device, the display device 120 may be eliminated. At this point, the all-in-one head-mounted device is configured to obtain video data from the server 100 and to perform playback operation, and the all-in-one head-mounted device is also configured to detect user's viewport and to adjust the playback operation according to the user's viewport.

Figure 2:
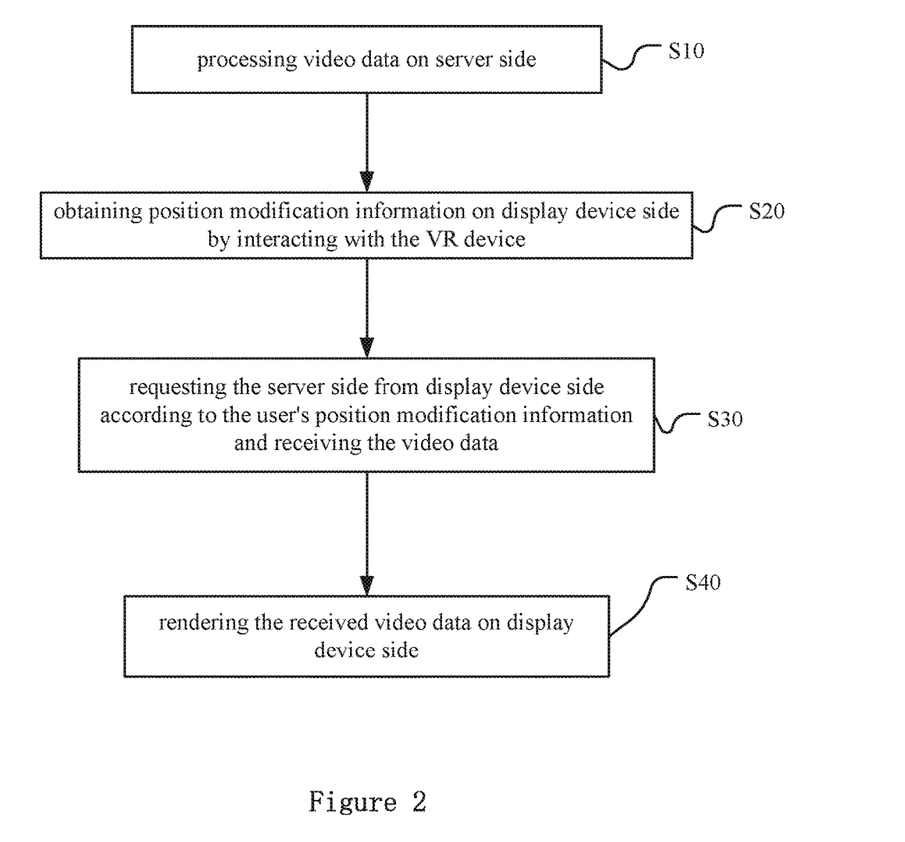
FIG. 2 is a flowchart presenting the process of the playback system in FIG. 1.

FIG. 2 is a flowchart presenting the process of the playback system in FIG. 1. The method includes the following steps.

In step S10, the server performs source video data processing.

In step S20, display device side obtains the user's viewport by interacting with the VR device.

In step S30, according to the user's viewport, the display device side requests the server side to provide the video data and receives the video data.

In step S40, the display device side renders the received video data.

In step S40, the video data from the server is mapped to a predetermined model so as to be played back. Specifically, the step S40 is shown in FIG. 3.

Figure 3:
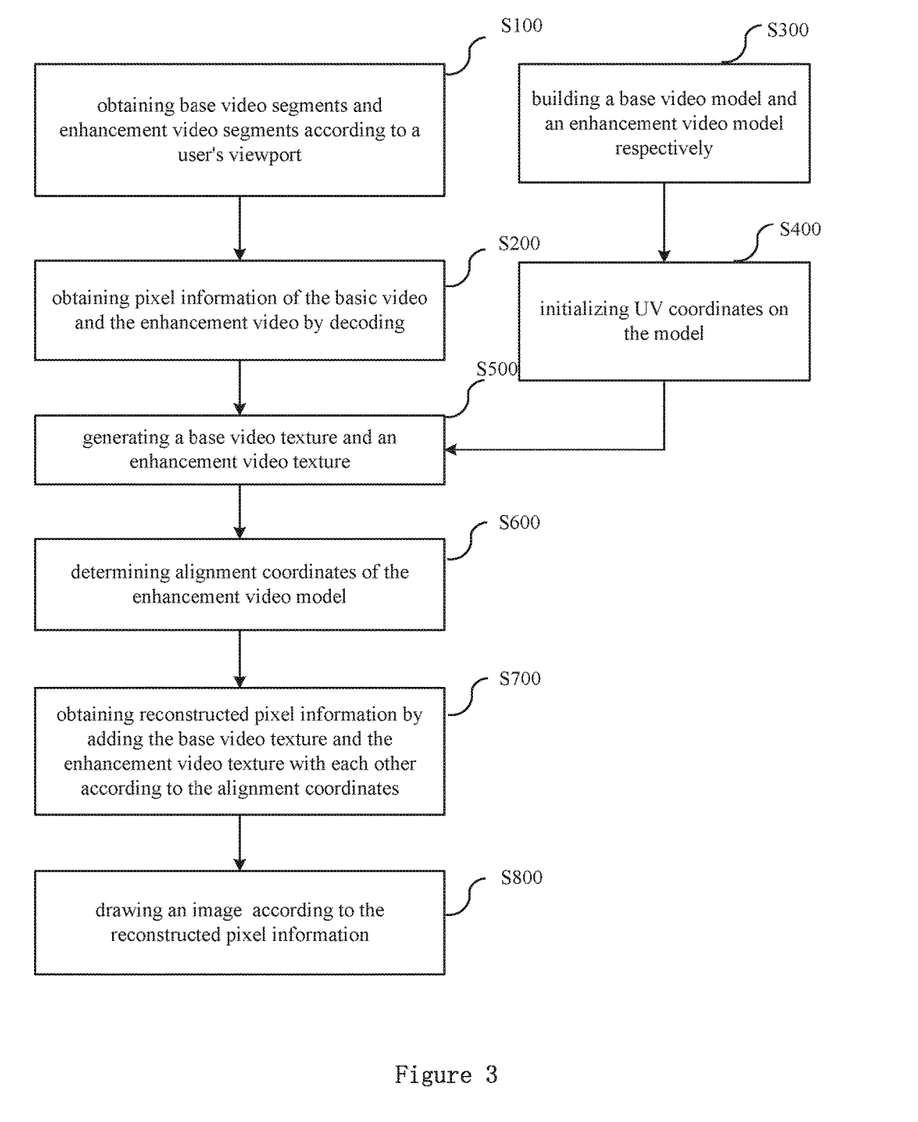
FIG. 3 is a flowchart presenting a method for rendering VR video according to an embodiment of the present disclosure.

FIG. 3 is a flowchart presenting a method for rendering VR video according to an embodiment of the present disclosure. Specifically, the method comprises the following steps.

In step S100, base video segments and enhancement video segments are obtained according to a user's viewport.

When the VR video is played back, a sensor device, such as a gyroscope device on a display device or a VR device, can detect position change of the user and send the location information to the device side (for example, a VR device, a display device, or a server). The user's viewport is determined according to the location information. During a video transcoding process on the server, original video data is processed into a plurality of video segments, for example, including base video segments and enhancement video segments, which need to be mixed with each other during playback. For example, the video segments are obtained by segmenting in accordance with a timeline and/or in a spatial dimension. In this step, the base video segments and the enhancement video segments are obtained from the server according to the user's viewport.

In step S200, the pixel information of the basic video and the enhancement video is obtained by decoding.

In this step, the base video segments and the enhancement video segments are decoded by a suitable decoder to obtain respective pixel information. The decoder performs a decoding process which may further include a decompression process for decompressing the compressed video data. For each of the different color spaces, different pixel components are extracted, for example, the R, G, B components.

In step S300, a base video model and an enhancement video model are built respectively.

In this step, one can build a 3D model in view of actual requirements. For example, one can create two polygonal spheres as the base video model and the enhancement video model.

In step S400, the UV coordinates on the model are initialized.

The UV coordinates refer to u, v mapping coordinates of a texture, similar to the spatial X, Y, Z axis of the spatial model. The UV coordinates define position information for each point on a plane that corresponds to the 3D model. Each point on an image can be accurately mapped to the 3D model according to the UV coordinates. In this step, each UV coordinate on the base video model and the enhancement video model is established.

In step S500, a base video texture and an enhancement video texture are generated.

In this step, a base video texture is generated according to the pixel information of the base video segments and the UV coordinates of the base video model, and an enhancement video texture is generated according to the pixel information of the enhancement video segments and the UV coordinates of the enhancement video model.

In step S600, alignment coordinates of the enhancement video model are determined.

In this step, the alignment coordinates of the base video model and the enhancement video model may be determined by the user's viewport.

In step S700, reconstructed pixel information is obtained by adding the base video texture and the enhancement video texture with each other according to the alignment coordinates.

In this step, the reconstructed pixel information is calculated based on a relationship between the base video segments and the enhancement video segments.

For easy understanding, the following example will be described.

Assuming that $Px,y^{Original}=(r,g,b)^T$ represents a pixel in the source video data with coordinates x, y, r, g, b∈[L,H], and $Px,y^{ScaledBase}=(r',g',b')^T$ represents a pixel in the basic video with coordinates x, y, r', g', b'∈[L,H], all of the coordinates x, y satisfy the following Equation (1) for generating a differential value:

$$Px, y^{NormalizedResidual} = Px, y^{Original} - Px, y^{ScaledBase} + \frac{H-L}{2}.$$

where $Px,y^{NormalizedResidual}$ represents the differential value of the pixel, all of the coordinates x, y satisfy the following Equation for reconstructing the differential value:

$$Px, y^{Reconstructed} = Px, y^{ScaleBase} + Px, y^{NormalizedResidual} - \frac{H-L}{2}.$$

In step S800, an image is drawn according to the reconstructed pixel information.

In the method for real-time rendering VR video according to the present disclosure, the base video segments and the enhancement video segments are downloaded from the server. The VR video data is played back by adding the basic video and the enhancement video. The alignment coordinates of the basic video and the enhancement video are determined according to the user's viewport, thus reducing data transmission and improving rendering efficiency without affecting the user's viewing experience.

It should be noted that in the foregoing embodiment, there may be many enhancement video segments, which is determined by a segmentation method of the video segments, for a specific field of view. The above steps will be repeated for each of the enhancement video segments to render by adding with the base video segments.

Alternatively, the API of OpenGL and/or WebGL is called to achieve related functions. OpenGL (Open Graphics Library) defines graphical programming interfaces for drawing two-dimensional or three-dimensional images. WebGL (Web Graphics Library) is a 3D drawing protocol.

Further, in step S600, the alignment coordinates of the enhancement video segments after being aligned may be calculated from the alignment coordinates of the enhancement video segments before being aligned. Details are shown in Table 1.

TABLE 1

| variant | meaning |
|---|---|
| fov | user's viewport |
| i | zoom factor |
| id | identification of enhancement video segment |
| Δ | constant, unit step (0.125 in the present disclosure) of offset |

TABLE 1-continued

| variant | meaning |
|---|---|
| $(P_u^{Before}, P_v^{Before})$ | alignment coordinate of the enhancement video texture before being aligned |
| $(P_u^{After}, P_v^{After})$ | alignment coordinate of the enhancement video texture after being aligned |

Assuming a field of view fov to be $$fov \in \left\{\frac{\pi}{4}, \frac{\pi}{2}, \frac{3\pi}{4}, \pi, \frac{5\pi}{4}, \frac{3\pi}{2}, \frac{7\pi}{4}, 2\pi\right\},$$

and a zoom factor i to be calculated from fov according to Equation:

$$i = \frac{fov}{\frac{\pi}{4}},$$

and then
$P_u^{Before}$ is converted to $P_u^{After}$ by Equation:

$$P_u^{After} = \left[\left(\frac{i}{8} + id*\Delta\right) * P_u^{Before}\right] \% 1, \; id*\Delta \in [0, 1]$$

$P_v^{Before}$ is converted to $P_v^{After}$ by Equation:

$$P_v^{After} = \frac{1}{4} + \frac{1}{2} * P_v^{Before}.$$

where id represents an identifications of the enhancement video segment, which is obtained when the video data is segmented into the base video segments and the enhancement video segments in a video transcoding process, and is a positive integer starting from 0.

In the above example, by setting an enumeration value of the user's viewport and an initial UV coordinate of the enhancement video texture, a resultant UV coordinate of the enhancement video texture may be calculated when the user's viewport is changed. It should be understood that those skilled in the art can obtain the UV coordinate of the enhancement video texture by other methods.

Figure 4:
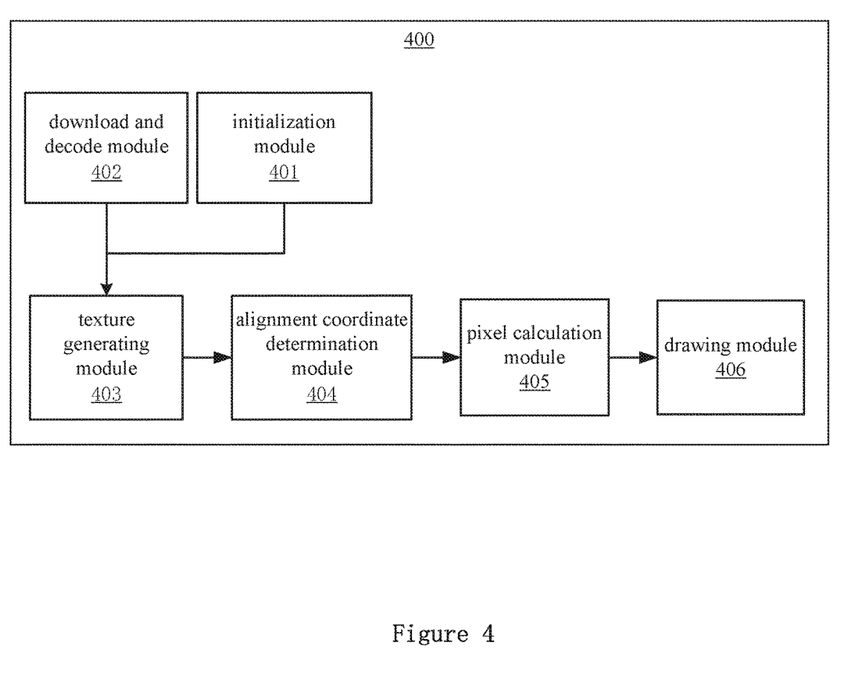
FIG. 4 is a block diagram presenting a system for rendering VR video according to an embodiment of the present disclosure.

FIG. 4 is a block diagram presenting a system for rendering VR video according to an embodiment of the present disclosure.

A system 400 for rendering VR video includes an initialization module 401, a download and decode module 402, a texture generation module 403, an alignment coordinate determination module 404, a pixel calculation module 405, and a drawing module 406.

The initialization module 401 is configured to build a base video model and an enhancement video model respectively and initialize UV coordinates of the base video model and the enhancement video model. Spherical, cylindrical or other shaped 3D models may be built. UV coordinates in the 3D model may be initialized.

The download and decode module 402 is configured to obtain base video segments and/or enhancement video segments according to a user's viewport, and obtain pixel information of the base video segments and the enhancement video segments by decoding. The user's viewport may be obtained from roll parameters of a gyroscope device. Further, one or more basic and/or enhancement video segments may be determined to be downloaded according to the video which is being played back and according to the user's viewport.

The texture generating module 403 is configured to generate a base video texture according to the pixel information of the base video segment and the UV coordinates of the base video model respectively, and to generate the base video texture according to the pixel information of the enhancement video segment and the UV coordinates of the enhancement video model.

The alignment coordinate determination module 404 is configured to determine alignment coordinates of the enhancement video texture according to the user's viewport.

The pixel calculation module 405 is configured to generate reconstructed pixel information by adding the base video texture and the enhancement video texture with each other according to the alignment coordinates.

The drawing module 406 is configured to draw an image according to the reconstructed pixel information.

Preferably, the base video model and the enhancement video model are the same polygonal sphere.

The embodiments were chosen and described in order to best explain the principles of the disclosure and its practical applications, to thereby enable others skilled in the art to best utilize the disclosure. The disclosure is intended to cover alternatives, modifications and equivalents that may be included within the spirit and scope of the disclosure as defined by the appended claims.

The foregoing descriptions of specific embodiments of the present disclosure have been presented, but are not intended to limit the disclosure to the precise forms disclosed. It will be readily apparent to one skilled in the art that many modifications and changes may be made in the present disclosure. Any modifications, equivalence, variations of the preferred embodiments can be made without departing from the doctrine and spirit of the present disclosure.

The invention claimed is:

1. A method for real-time rendering VR video, comprising:
    building a base video model and an enhancement video model respectively;
    initializing UV coordinates of the base video model and the enhancement video model;
    obtaining base video segments and enhancement video segments according to a user's viewport;
    obtaining pixel information of the base video segments and the enhancement video segments by decoding;
    generating a base video texture according to the pixel information of the base video segments and the UV coordinates of the base video model, and an enhancement video texture according to the pixel information of the enhancement video segments and the UV coordinates of the enhancement video model;
    determining alignment coordinates of the enhancement video texture;
    generating reconstructed pixel information by adding the base video texture and the enhancement video texture according to the alignment coordinates; and
    drawing an image according to the reconstructed pixel information.

2. The method according to claim 1, wherein the base video model and the enhancement video model are the same polygonal sphere.

3. The method according to claim 1, wherein the user's viewport is obtained from roll parameters of a gyroscope device.

4. The method according to claim 1, wherein the alignment coordinates of the enhancement video texture after being aligned are calculated from the alignment coordinates of the enhancement video texture before being aligned.

5. The method according to claim 4, wherein the step of calculation comprises:

setting a field of view fov to be $$fov \in \left\{\frac{\pi}{4}, \frac{\pi}{2}, \frac{3\pi}{4}, \pi, \frac{5\pi}{4}, \frac{3\pi}{2}, \frac{7\pi}{4}, 2\pi\right\},$$

and a zoom factor i to be calculated from fov according to Equation:

$$i = \frac{fov}{\frac{\pi}{4}},$$

wherein the U value $P_u^{Before}$ of the enhancement video texture before being aligned is converted to the U value $P_u^{After}$ of the enhancement video texture after being aligned by Equation:

$$P_u^{After} = \left[\left(\frac{i}{8} + id * \Delta\right) * P_u^{Before}\right] \% 1,$$

where id is an identification of respective one of the enhancement video segments, $id*\Delta \in [0,1]$, and the V value $P_v^{Before}$ of the enhancement video texture before being aligned is converted to the V value $P_v^{After}$ of the enhancement video texture after being aligned by Equation:

$$P_v^{After} = \frac{1}{4} + \frac{1}{2} * P_v^{Before}.$$

6. The method according to claim 1, wherein the step of generating reconstructed pixel information by adding the base video texture and the enhancement video texture according to the alignment coordinates comprises:

generating the reconstructed pixel information by Equation, $$Px, y^{Reconstructed} = Px, y^{ScaleBase} + Px, y^{NormalizedResidual} - \frac{H-L}{2},$$

wherein $Px,y^{Reconstructed}$ represents the reconstructed pixel information at the coordinate (x, y), $Px,y^{ScaleBase}$ represents the pixel information of the base video texture at the coordinate (x, y), $Px,y^{NormalizedResidual}$ represents the pixel information of the enhancement video texture at the coordinate (x, y), H and L represent a maximum value and a minimum value of the pixel information respectively.

7. The method according to claim 1, wherein the API of OpenGL and/or WebGL is called to achieve related functions.

8. A system for real-time rendering VR video, comprising:
an initialization module, configured to build a base video model and an enhancement video model respectively, and initialize UV coordinates of the base video model and the enhancement video model;
a download and decode module, configured to obtain base video segments and enhancement video segments according to a user's viewport, and obtain pixel information of the base video segments and the enhancement video segments by decoding;
a texture generation module, configured to generate a base video texture according to the pixel information of the base video segment and the UV coordinates of the base video model respectively, and to generate an enhancement video texture according to the pixel information of the enhancement video segment and the UV coordinates of the enhancement video model;
an alignment coordinate determination module, configured to determine alignment coordinates of the enhancement video texture;
a pixel calculation module, configured to generate reconstructed pixel information by adding the base video texture and the enhancement video texture according to the alignment coordinates; and
a drawing module, configured to draw an image according to the reconstructed pixel information.

9. The system according to claim 8, wherein the base video model and the enhancement video model are the same polygonal sphere.

10. The system according to claim 8, wherein the user's viewport is obtained from roll parameters of a gyroscope device.

* * * * *